United States Patent Office 3,245,951
Patented Apr. 12, 1966

3,245,951
FLAVOR COMPLEXES COMPRISING MORPHOLIN-3-ONES AND 4-HYDROXY-3-ALKOXYBENZALDEHYDE
Wilhelm E. Walles, Midland, Mich., assignor to The Dow Chemical Company, Midland, Mich., a corporation of Delaware
No Drawing. Filed Aug. 24, 1964, Ser. No. 391,756
3 Claims. (Cl. 260—64)

This application is a continuation-in-part of my copending application Serial No. 40,536, filed July 5, 1960.

The present invention is concerned with complexes of two kinds of members, one of which is called the complectant and is characterized by containing a morpholinone nucleus and being selected from the group consisting of morpholin-3-one, loweralkylmorpholin-3-one, N - vinylmorpholin-3-one, poly-N-vinylmorpholin-3-one, polyloweralkyl-N-vinylmorpholin-3-one, and a copolymer of N-vinylmorpholin-3-one and one of styrene and divinylbenzene, and the other of which is called a complectate and is a member of the group consisting of 4-hydroxy-3-methoxybenzaldehyde and 4-hydroxy-3-ethoxybenzaldehyde. These two latter aromatic substances are commonly known by their non-systematic names of vanillin and bourbonal.

Vanillin and bourbonal occur in many natural substances and either as extract from natural source or as synthetic material are widely used in flavoring and as odorant substances. However, they have suffered the disadvantage of relatively high volatility so that, especially in situations wherein they are exposed to heat, either or both of the substances may be substantially lost through volatilization. This is true in, for instance, the baking of sweet goods, the cooking of candy syrups, and the like. Also, persons continuously or repeatedly exposed to contact with one of these phenolic substances in high concentration sometimes manifest a malady characterized by dermal irritation, and called vanillism.

I have now discovered that the volatility of either of these substances can be inhibited without seriously impairing its usefulness as a flavoring agent or odorant, meanwhile reducing the likelihood of vanillism through inhibition of the phenolic hydroxyl group, by forming a complex of either or both of vanillin and bourbonal with a morpholinone compound of the group set forth hereinbefore.

Both vanillin (melting temperature 81° C.) and bourbonal (melting temperature 77.5° C.) are solids under ordinary conditions. Most of the morpholinone complexes are, also. Complexes of the present invention are readily formed by dissolving the morpholinone compound and the aromatic substance together in a common solvent, or by melting them together, or by milling and finely combining through physical intimacy under pressure in the solid phase. The complexes form readily in room temperature and are stoichiometric in the sense that one molecule of vanillin or bourbonal can form a unit complex with one morpholinone moiety. Thus when the aromatic substance is supplied in amount greater than that equimolecular with the molecular recurrence of morpholinone moieties, excess aromatic substance will appear in the resulting complex. When a molecular excess of morpholinone moieties is present, the resulting complex will have unused capacity to form further complex with one of the said aromatic substances. By supplying both kinds of substance to the preparation of complex in such amount that each is equimolecular with the other, greatest efficiency in complex formation is enjoyed.

When it is intended to use the complex solely as an odorant, as, for example, as a space odorant, any of the said morpholinone compounds can be employed. When it is intended to employ the complex as a flavoring agent in food, it is satisfactory to employ a polymeric morpholinone compound of the sort stated, because the polymers are essentially tasteless, odorless, biologically inert, substances, easily adapted to food preparation. They tend to be solids readily selected as to solubility in water and other common food fluids, and can conveniently be presented in finely granulated form.

The invention is represented by the following example which represents the best embodiment now known to the inventor.

*Example.—Complex of vanillin and polymeric 4-vinylmorpholin-3-one*

A dry mixture of 40 grams vanillin meeting the specification therefor in the United States Pharmacopoeia, Revision XV, and 60 grams of polymeric 4-vinylmorpholin-3-one of an average molecular weight corresponding to a Fikentscher K-value of 70 is placed on a roll mill comprising two tangential corotating hollow steel rollers, one cooled by an internal flow of cold water, the other heated internally by steam at about 180° C., for a period of time to provide intimate mixing and blending, partial fusion and cocompression of the component materials and heating to a transient upper limit temperature of about 180° C. Under these conditions a complex forms as a pale yellow thermoplastic solid which tends to adhere to, and is repeatedly removed from the cold roller and further milled. Upon cooling, this substance becomes a rubbery solid. This solid is allowed to stand undisturbed for five days, during which time it in some way changes form, becoming a hard and brittle solid having a strong but pleasant odor of vanillin. This brittle material is then reduced in a ball-mill to a fine powder.

Similar complexes are prepared from the same starting materials employing other techniques such as mixture of solvent solutions of materials. Also, such complexes employing the starting materials in various proportions are also prepared. Also, a complex identical but that bourbonal is the aromatic substance is identically prepared.

The vanillin complex is tested for loss of complexed vanillin as a result of heating, and the results of such test are compared with similar loss from a sample of Vanillin U.S.P. (XV). Two samples of vanillin are employed as check samples; one is in the form of fine crystals of a highly refined commercial grade, the other is prepared therefrom by melting a portion of such vanillin at 125°, casting it in a mold to obtain a solid block approximately 2 inches long, ¾ inch wide, and ¼ inch thick. This procedure is carried out to obtain a continuous solid sample of area smaller than that of granular vanillin in order to compare the volatility of the vanillin in such form with the complex in the form of coarse irregular pieces of the same order of size as the cast block of vanillin. Two different complex samples are employed in the test. One such sample is satisfied and is prepared by contacting together one mole of vanillin and 0.8 mole (on a morpholinone moiety basis) of complectant, and is employed without subsequent purification. The product contains free vanillin, representing the excess thereof over the amount which the complectant can bind. A second sample is unsatisfied and is prepared by contacting together 1.8 moles of complectant for each mole of vanillin. This second sample is also employed without further purification but is believed to contain little or no uncomplected vanillin.

In carrying out the test, the two vanillin samples and the two complex samples are placed, as approximately equal layers, in separate evaporating dishes and heated in the same oven under subatmospheric pressures of from 6 to 10 millimeters of mercury. Heating is carried out at gradually rising temperatures for approximately 4 days, to an upper limit temperature of 140° C., by which time both samples of vanillin have completely evaporated. The satisfied complex has lost less than 20 percent initial weight and the unsatisfied complex about 10 percent. Upon cooling, the complexes are found to exhibit the characteristic odor of vanillin. A sample of the unsatisfied complex surviving the above vacuum-oven test is stored in a sheltered open container at room temperature for a period of more than one year. At the end of this time the said sample has the characteristic odor of vanilla scarcely diminished and, upon superficial examination, appears to have undergone no noticeable change during that time.

The vanillin employed in the preparation of the present complex is of U.S.P. grade and is believed to be synthetic. The complectant is a water-soluble polymer. Related complexes are readily formed employing vanillin from natural sources such as the so-called vanilla bean, foliage of young plants of the genus Melilotus, and the like. In this connection it is to be noted that the adjacent higher homologue of vanillin, bourbonal, also forms a complex according to the present invention. Thus, a multiple complex is readily prepared wherein various fragrance-producing substances desirable in food, pharmaceuticals, perfumes, industrial fragrances and the like may efficiently be removed from their natural sources in a form which renders the desired fragrances readily available. Moreover, by the judicious selection of a complectant according to the present invention, whether alone or in solution, it is possible to prepare complexes which are, optionally, liquids, highly viscous liquids, gels, soft solids, or firm solids soluble in any of a wide range of solvents, or, as may be desired, insoluble in all known solvents by reason of extensive cross-linking.

I claim:

1. Complex of two kinds of members, one of which is characterized by containing a morpholinone nucleus and being selected from the group consisting of morpholin-3-one, loweralkylmorpholin-3-one, N - vinylmorpholin-3-one, poly-N-vinylmorpholin-3-one, poly-loweralkyl-N-vinylmorpholin-3-one, and a copolymer of N-vinylmorpholin-3-one and one of styrene and divinylbenzene, and the other of which is a member of the group consisting of 4-hydroxy-3-methoxybenzaldehyde and 4-hydroxy-3-ethoxybenzaldehyde.

2. Complex of vanillin and poly-N-vinylmorpholinone.

3. Complex of bourbonal and poly-N-vinylmorpholinone.

References Cited by the Examiner

UNITED STATES PATENTS 2,774,791  12/1956  Alt _____ 260—600
2,987,509   6/1961  Burgert _____ 260—88.3

WILLIAM H. SHORT, *Primary Examiner.*